Aug. 16, 1927. B. B. KAHN Re. 16,707

HEATER

Original Filed Sept. 16, 1921 6 Sheets-Sheet 1

Inventor
Bertrand B. Kahn
Robert M. Sox
Atty.

Aug. 16, 1927. B. B. KAHN Re. 16,707

HEATER

Original Filed Sept. 16, 1921 6 Sheets-Sheet 2

Inventor
Bertrand B. Kahn
Robert M. Scott
Atty.

Aug. 16, 1927. B. B. KAHN Re. 16,707

HEATER

Original Filed Sept. 16, 1921 6 Sheets-Sheet 3

Inventor:
Bertrand B. Kahn
Robert M. Sy
Atty.

Aug. 16, 1927. B. B. KAHN Re. 16,707

HEATER

Original Filed Sept. 16, 1921 6 Sheets-Sheet 4

Inventor
Bertrand B. Kahn
Robert M. Sax
Atty.

Aug. 16, 1927. B. B. KAHN Re. 16,707

HEATER

Original Filed Sept. 16, 1921 6 Sheets-Sheet 5

Inventor
Bertrand B. Kahn
Robert M. Sye
Atty.

Aug. 16, 1927. B. B. KAHN Re. 16,707

HEATER

Original Filed Sept. 16, 1921 6 Sheets-Sheet 6

Inventor
Bertrand B. Kahn
Robert M. Sye
Atty.

Reissued Aug. 16, 1927. Re. 16,707

UNITED STATES PATENT OFFICE.

BERTRAND B. KAHN, OF CINCINNATI, OHIO, ASSIGNOR TO THE ESTATE STOVE COMPANY, OF HAMILTON, OHIO, A CORPORATION OF OHIO.

HEATER.

Original No. 1,457,078, dated May 29, 1923, Serial No. 501,100, filed September 16, 1921. Application for reissue filed May 25, 1925. Serial No. 32,852.

My invention relates to heaters, and is concerned with the provision of a portable heater of distinctive and pleasing appearance adapted to be placed in a living room, for example, and characterized by certain novel features of construction and by an improved plan of operation hereinafter fully described.

A description of my invention will best be understood when read in connection with the illustrative drawings; hence I shall proceed at once to describe the accompanying drawings in which—

Fig. 2 is a side elevational view thereof,

Similar characters of reference refer to similar parts throughout the several views.

The heater comprises the cast iron fire pot 15, which is carried upon ash box casting 16, from which is suspended the grate hereinafter described in detail. The ash box indicated at 16 contains a suitable ash pan 17 and is provided with a door 18 which is hingedly mounted upon the forward end of the ash box in the usual manner so as to furnish a substantially air tight closure. Door 18 is provided with a pair of screw draft registers 19—19 by means of which admission of air to the ash box can be easily and accurately controlled.

Figure 4:
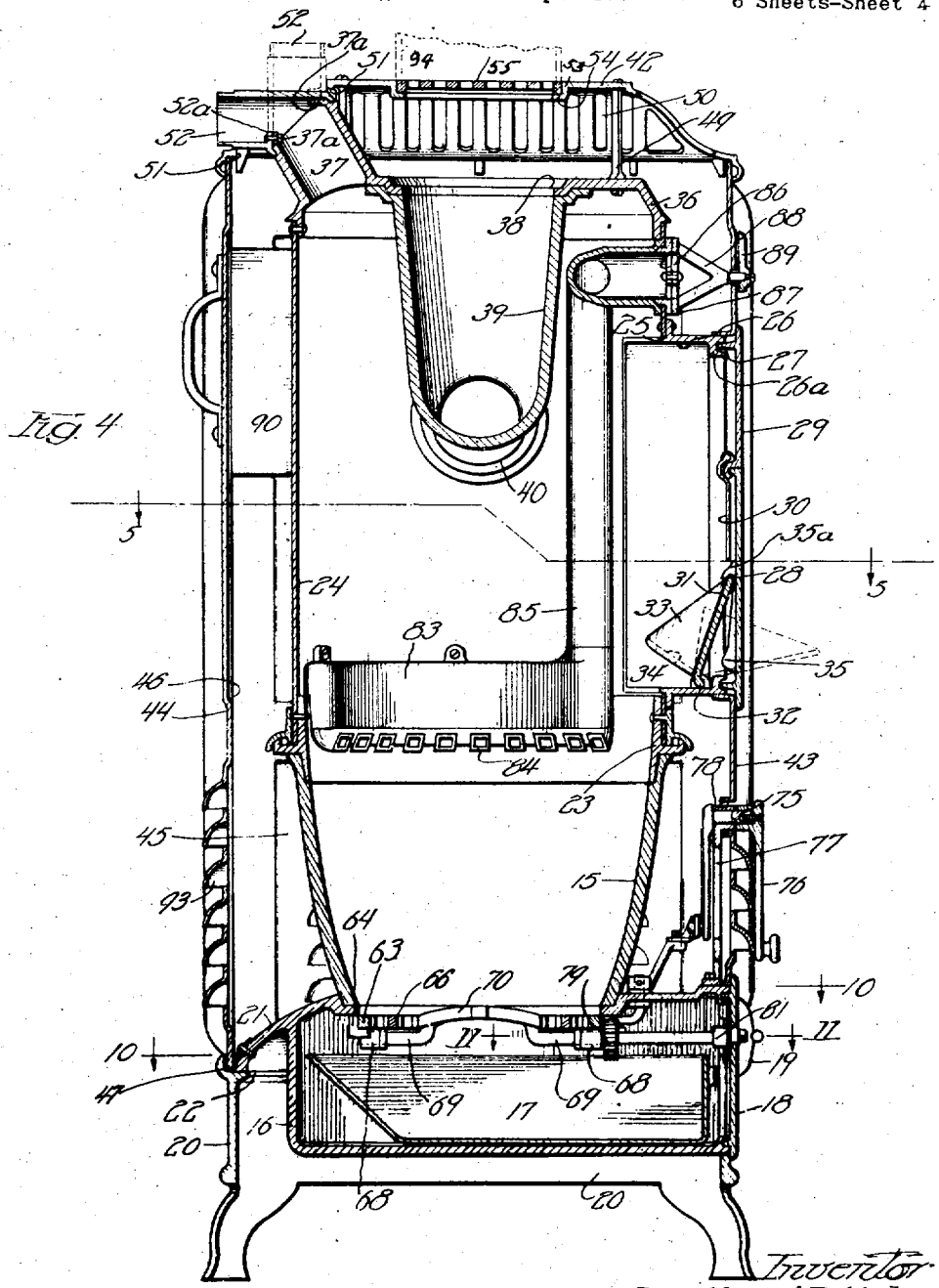
Fig. 4 is a vertical sectional view taken on the line 4—4, of Fig. 5.

The lower forward edge of the ash box casting rests directly upon the base 20, as is clearly illustrated in Fig. 4. The ash box casting is provided with an integral apron 21, which extends around the back and both sides thereof and is provided with a shoulder, which coacts with corresponding shoulders 22 formed on the upper edges of the back, sides, and a portion of the front of the base.

Resting upon the fire pot 15 and securely attached thereto through the medium of an anti-buckling ring 23 is a sheet metal drum 24. The drum 24 is provided with a fuel intake opening 25 into which are fitted and riveted the flanged inner edges of the feed door frame 26. The forward edges 26ª of the door frame 26 are inwardly flanged to provide a seat for the rearwardly projecting peripheral flange 27 of the feed door.

The feed door is formed in two parts, the lower being indicated by 28 and the upper by 29. A swinging curtain 30 hingedly depends from the lower edge of the upper door 29 in such manner that, when the lower door 28 is opened, it normally prevents the escape of smoke into the room but will be swung back by the impact of fuel being fed through the door.

It often happens in putting fuel into the stove that stray pieces of fuel are accidentally dropped to the floor. I have effectually guarded against this by the provision of a fuel chute 31 pivoted to the bottom of the door frame 26 as shown at 32 (Fig. 4). Chute 31 is provided at its ends with triangular flanges 33—33 which lie adjacent but spaced from the sides of the door frame and which in turn carry lateral shoulders 34 along the inner ends. When the feed door 28 is opened for the admission of fuel, chute 31 is allowed to fall by gravity until shoulders 34—34 catch upon the inwardly projecting flange 26ª of the door frame as indicated by dotted lines in Fig. 4. As the door 28 is closed, the forward edge of chute 31 engages the cammed guide strip 35 which is secured to the inner face of feed door 28. In this manner the forward edge of the chute is forced upward by the closing of the feed door, until the edge rests beneath the rearwardly projecting lug 35ª on the upper end of the guide strip 35, which prevents the center of gravity of the chute being swung past its pivotal axis.

The drum is riveted or otherwise secured to a cast iron cover 36, which is provided with an integral stub smoke pipe 37 and a central orifice 38. Secured to the cover 36 and depending from the edges of the orifice 38 thereof is an inverted substantially Y-shaped pipe comprising the vertical passage 39 and the branches 40—40. The outer ends of the branches communicate with the exterior of the drum, an air tight joint being effected by the aid of flanged rings 41.

It will be noted that all of the parts thus far described which lie above the base 20 are enclosed within a substantially square casing which comprises the base 20, a top 42, a front plate 43, a rear plate 44, and side plates 45—45. As is obvious from the drawing the use of a square casing around a cylindrical heating part provides increased space for the passage of the air to be heated. Also, due to the heating of the casing by radiation of heat from the heating part, additional heat transferring surface is provided. The plates 43, 44, and 45—45 are preferably formed of sheet iron or steel, strengthened by embossed panels 46, the lower edges of rear plate 44, and side plates 45—45 being received in the channel strips 47, the latter resting upon the shoulders 22 of base 20, between the edges of the apron 21 and bead 48 which surrounds the upper periphery of base 20. The inner sides of the channel strips 47 are extended obliquely, as indicated at 47ª, and through this wing the channel is riveted to the border of the apron 21. Channel strips 47 extend along the side and rear edges of the ash box apron, but are omitted along the front edge, the front plate 43 of the cabinet resting directly upon the shoulder 22 and adjacent the bead 48 of the front side of base 20. The central portion of the lower margin of the front plate merely lies over and in close contact with that portion of the ash box which acts as the ash door frame (Fig. 4). Through the use of the channel strips 47 attached to the apron 21, I have effected considerable facility in assembling and disassembling the heater, as the ash box and associated fire pot and drum may be lifted together with the assembled casing on or off the base 20 in a single operation.

The upper edges of plates 43, 44, and 45—45 lie within the lip 42ª of the dome 42. The dome is supported on posts 49—49 which rest upon the upper surface of drum cover 36. The dome is provided on its four sides with a plurality of slots 50—50 and with the rear opening 51 to receive the flue section 52. Flue section 52 has a mitre fitting with the stub flue 37 of the drum cover 36 and is held to the latter by means of lugs 52ª and 37ª—37ª projecting inwardly from the respective flues in such manner that the flue section 52 may easily be reversed as shown in dotted lines in Fig. 4, to lead to a vertical smoke pipe rather than to a pipe extending directly backward to a wall behind the heater.

A centrally located orifice 53 in the top of the dome 42 is provided with an annular shoulder 54 into which is normally fitted a grid plate 55. This allows the superheated air from the Y-shaped pipe 39 to be discharged directly upward into the room.

Figure 8:
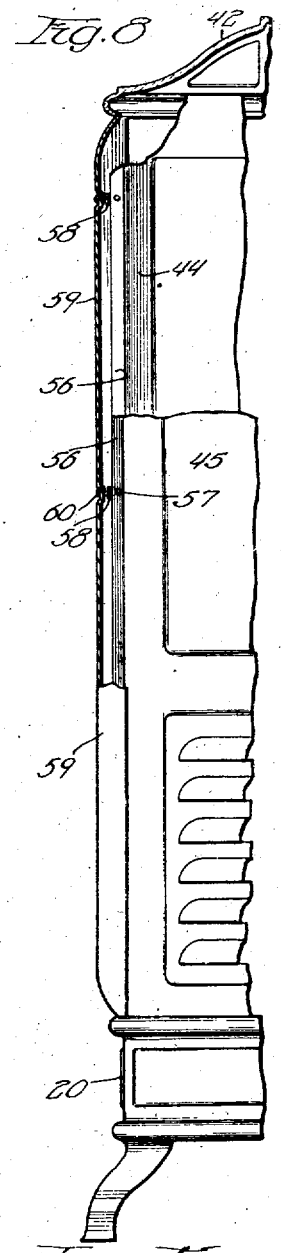
Fig. 8 is a fragmentary sectional view taken on the line 8—8 of Fig. 5.
Figure 5:
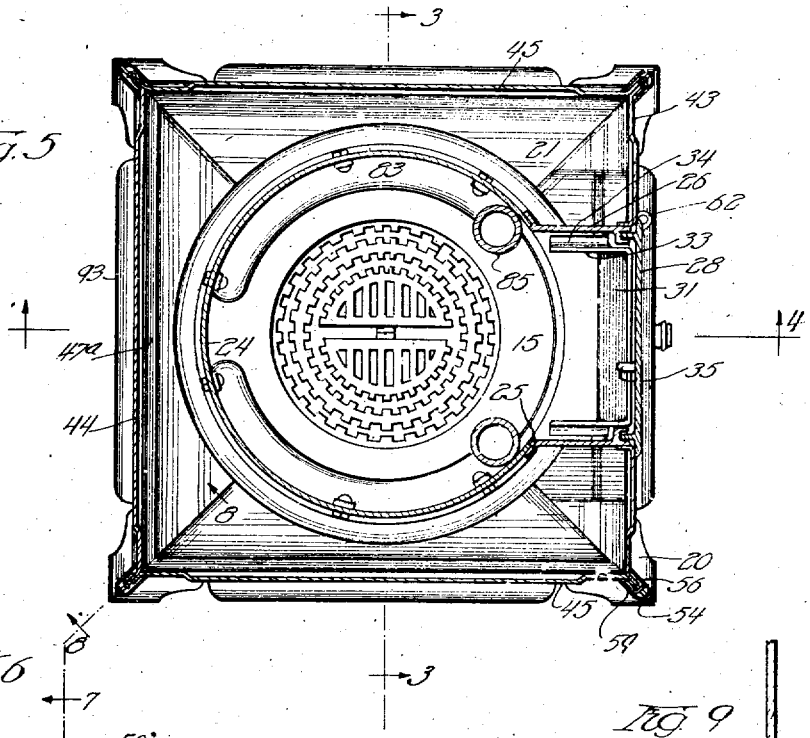
Fig. 5 is a horizontal sectional view taken on the line 5—5 of Fig. 4.
Figure 9:
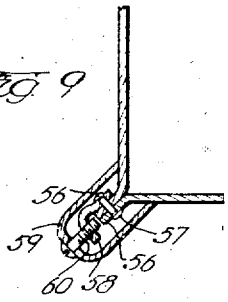
Fig. 9 is a fragmentary plan section on line 9—9 of Fig. 2.
Figure 7:
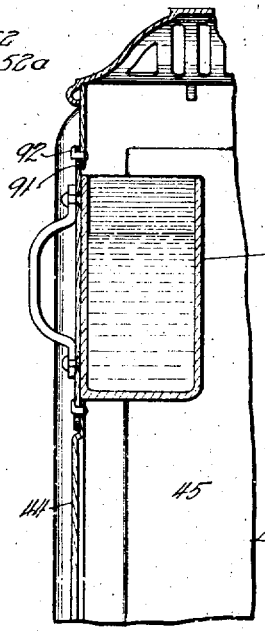
Figure 10:
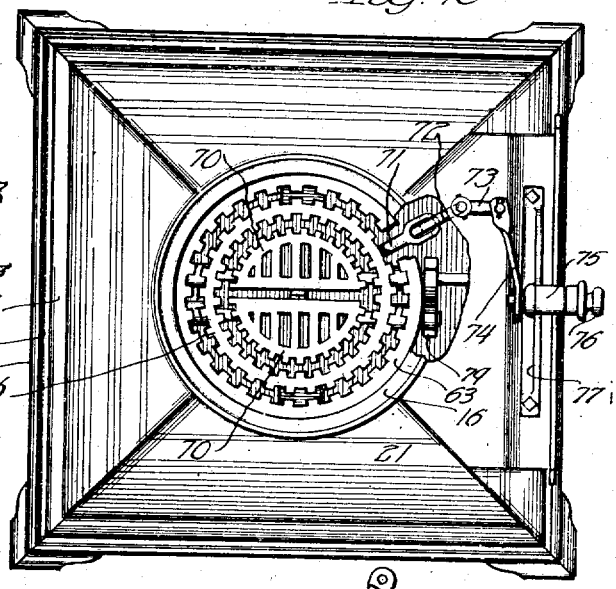
Fig. 10 is a plan view taken substantially on line 10—10 of Fig. 4 showing the base and ash box and shaker mechanism, but omitting the fire pot and side walls of the stove cabinet.

Referring now particularly to Figures 5, 8, and 9, it will be noted that the casing plates 43, 44, and 45—45 are provided with lateral flanges 56—56 which lie at angles of 45 degrees to the planes of the plates. Abutting flanges 56—56 are secured together at a plurality of vertically spaced points, the bolts or rivets 57 also passing through laterally extending L-shaped brackets 58.

A corner strip 59 of the U-shaped cross section overlies and conceals each pair of abutting flanges, strips 59 also lying at an angle of 45 degrees to the planes of the casing plates. Retaining screws 60 pass through the arch of the U strips and are threaded into the short legs of the L brackets 58, holding the legs of the U strips tightly against the casing plates. At their top and bottom extremities, the corner strips 59 are reduced to a right angled cross section, at which points the flanges 56 of the cabinet plates are discontinued.

The front plate 43 is provided with an opening which registers with the feed door frame 26, and the metal of the front plate is preferably turned inwardly around the adjacent surfaces of the frame, as is clearly illustrated in Fig. 4. This inturned flange of plate 43 is normally spaced somewhat from the upper margin of the door frame in order that the latter may move upwardly a fraction of an inch when the door frame is carried upwardly by the vertical expansion of the drum 24, fire pot 15, and associated parts, without disturbing the casing plates as they rest in channels 47 upon the base 20. The margins of the doors 28 and 29, however, are extended (see Figs. 4 and 5) so that at all times the door openings are tightly closed. The front plate is provided with suitable apertures through which project the door hinge ears 61—61 which are formed integral with frame 26. Ears 61—61 cooperate with corresponding ears 62—62 formed upon the doors 28 and 29.

The casing in practice is coated with vitreous enamel, or similar material, which may be suitably colored and grained. This aids in giving the heater a distinctive and pleasing appearance and enables it to be cleaned merely by dusting the surface of the casing which is substantially smooth.

The grate consists of an annular frame 63 supported on a plurality of lugs 64 depending from the ash box casting 16. Depending from the frame 63 are a plurality of brackets 65 which are formed with arcuate tracks having the same center as the frame 63. A shaker ring 66 is supported on the brackets 65 by depending rollers 67. The frame 63 is also provided at front and back with a pair of journals 68—68 in which are journaled trunnions 69 carrying grate dumpers 70.

In order that the shaker ring 66 may be reciprocated from outside the heater casing, it is provided with a slotted arm 71 pivoted to an arm 72 which is secured to an arm 73, connected to a link 74. The link 74 is pivotally secured to a pivoted crank 75 to which an operating arm 76 outside the casing is also secured. The pivot of crank 75 is supported by a frame 77 mounted on the ash box casting 16 and extends through an opening 78 in the front wall of the casing, the upper edge of the opening being spaced from the axis 75 in order to permit upward movement of the axis by reason of expansion of the inner parts of the heater. The front ends of the trunnions 69 of the grate dumpers 70 carry intermeshing gears 79, and one of the trunnions is extended forwardly and terminates in a tapering four sided terminal 80. The terminal 80 is engaged by a similarly formed socket 81, journaled in the door 18 and bearing outside the door a squared head 82. By this construction the grate may be dumped from outside the cabinet and at the same time the door 18 may be opened when desired, and when again closed, the terminal 80 will again be operatively received in the socket 81.

Figure 3:
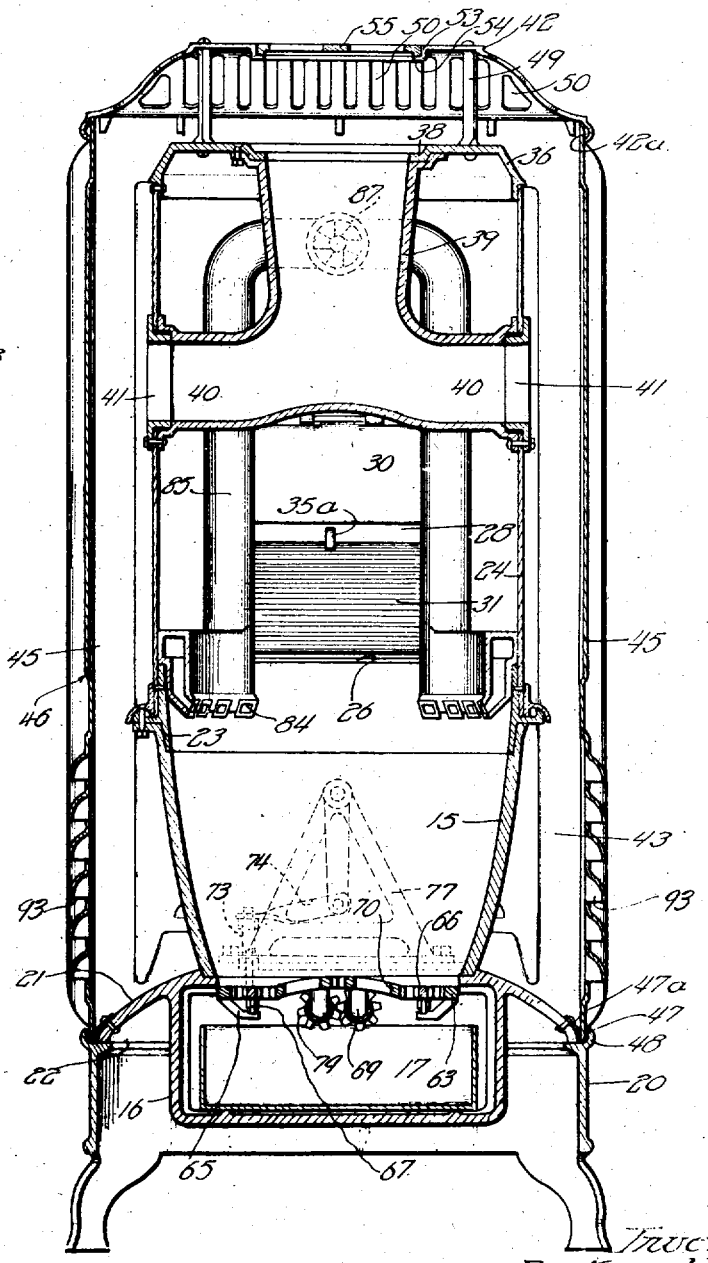
Fig. 3 is a vertical sectional view taken on the line 3—3, of Fig. 5.

I prefer to equip the heater of my invention with a hot blast attachment of the type shown in Figures 3, 4 and 5. The hot blast attachment comprises a pair of hollow castings 83—83, which are disposed within and secured to the lower portion of the drum 24, and provided with a plurality of tuyères 84, which discharge downwardly into the fire pot. Communicating with and formed integral with, or attached to, the castings 83—83 is a conduit 85 of inverted U shape, which, at its upper end, is provided with an air intake opening 86, which is controlled by a rotary damper 87. The damper 87 is rotatably connected with a plate in which are formed the openings 86, and carries a frame 88 which extends through the front wall of the cabinet and carries a handle 89 on the outside. This cabinet wall opening is formed with an expansion space above the bearing of frame 88. The function of the hot blast attachment will more fully hereinafter appear.

Figure 1:
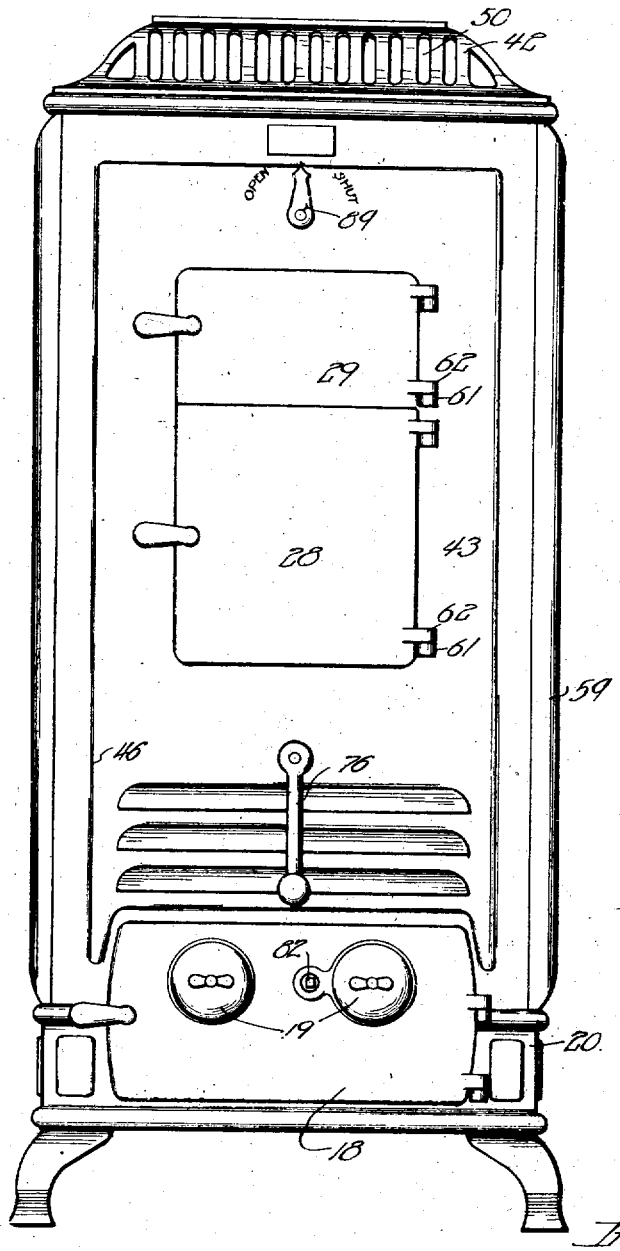
Fig. 1 is a front elevational view of the heater of my invention.
Figure 7:
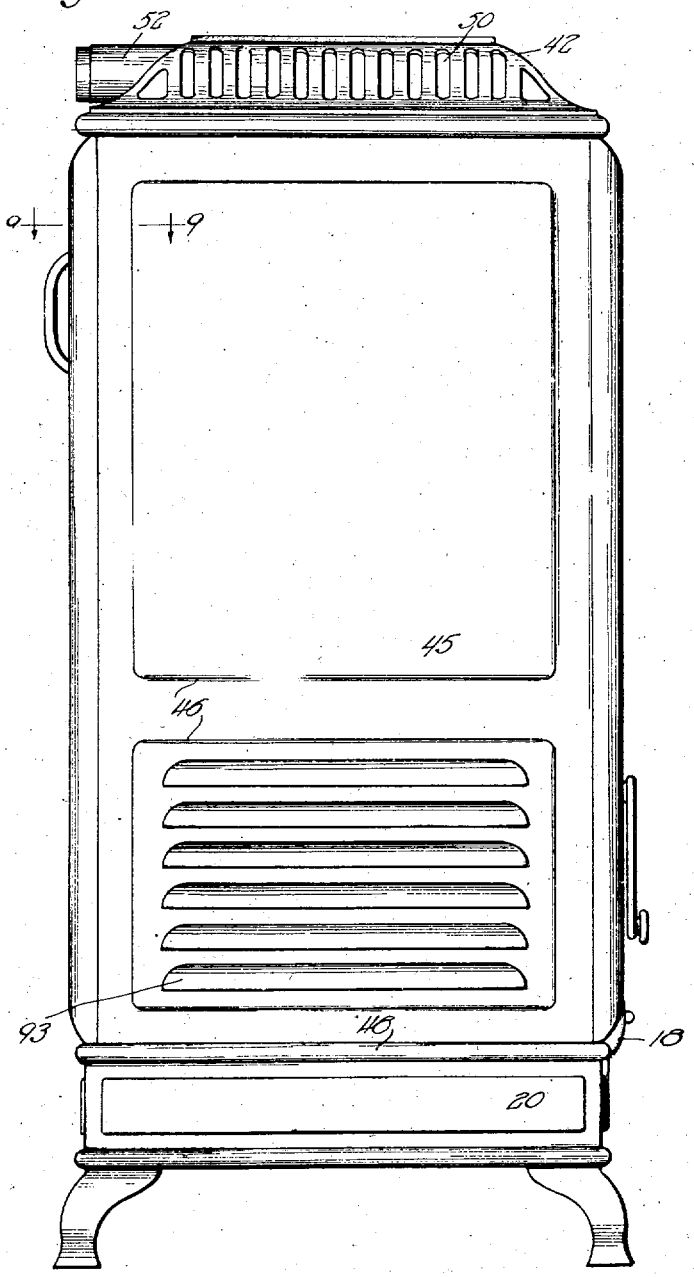
Fig. 7 is a fragmentary section taken on the line 7—7 of Fig. 6.
Figure 6:
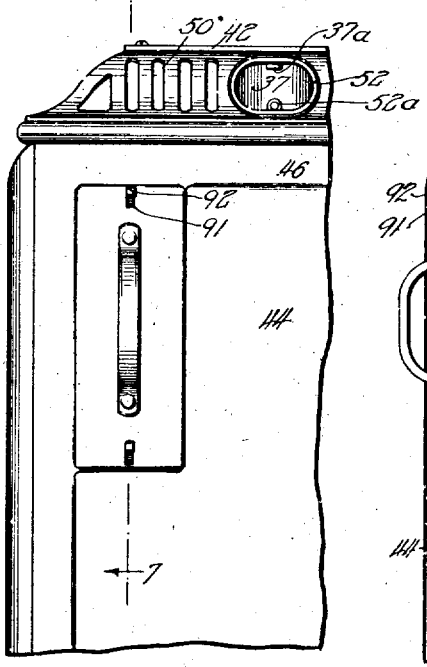
Fig. 6 is a fragmentary rear elevational view.

I now call attention to the vapor tank which is carried by the rear casing plate 44, and which lies in the space between the said casing plate and the drum 24. (Figures 4, 6 and 7.) The vapor tank is indicated at 90, and is inserted through an opening in casing plate 44. The face of the tank carries a suitable handle, and it will be noted that the face of the tank is both longer and wider than the opening in the plate. Any suitable means may be provided for holding the vapor tank in position. For instance, I have provided the top and bottom of the face with slots 91, which engage lugs 92 formed on the wall 44.

I now call particular attention to the louver openings 93, which are formed in the lower portions of the plates forming the casing. The louver openings are located directly opposite the fire pot, and are adapted to admit cold air to the casing and to cause this cold air to impinge directly upon the fire pot. I find that for my purpose, the louver type of opening is far more effective than any other type of air intake opening, because when the louver type of opening is employed, the incoming cold air is forced to travel directly into engagement with the fire pot. The air impinging against the fire pot is heated to a very high temperature almost instantly, and rises in the space between the casing and the drum. The louver type of opening is also desirable because when this type of opening is employed the fire pot is effectively concealed from view.

Large quantities of air are circulated through the casing during heating action, and as is obvious from the drawing, the inlet opening 93 is made of liberal proportions, so that despite the rapidity with which the air moves through the passage as it is progressively heated therein, the setting up of rapidly flowing currents in the room by the cold air as it passes to the louvers is prevented, and a comparatively large quantity of air flows to the heater at a rather low velocity. Rapidly flowing currents of air along the floor would tend to entrain dust and the like and to carry it into the heater, and as the current of heated air coming out of the top of the heater travels at a considerable velocity in its flow upward such dust would therefore tend to soil the ceiling above the heater. The imperforate upper portions of the casing sides provides an enclosed vertical passage for the air as it is being heated, and causes the discharge of a large body of hot air at the top portion of the heater, the heater thus operating as a circulation type convection heater as distinguished from one having discharge openings all along the passage and walls where the air obtains its heat.

A portion of the air which rises in the space between the casing and the drum passes directly upward and out through the slots in the dome 42. A portion of the rising air passes through the Y-shaped passage afforded by conduits 40 where it is superheated, and then directed into the dome and thence outwardly through the slots in the latter. When the hot blast damper 87 is open, a portion of the preheated air in the space between the casing and drum is taken into the U-shaped passage 85 and passes downwardly into casting 83 and out of tuyères 84. The air directed into the fire pot through the tuyères is superheated to a very high temperature in passing through passage 85 and casting 83, and when discharged into the fire pot produces thorough combustion of the unburnt gases rising from the fuel bed and consumes the soot, and tends to prevent accumulation of dead ashes at the outer edge of the fire.

The vapor tank insures that the air discharged through the dome openings will be properly humid, and likewise keeps a considerable quantity of hot water available whenever the heater is in operation.

Figure 12:
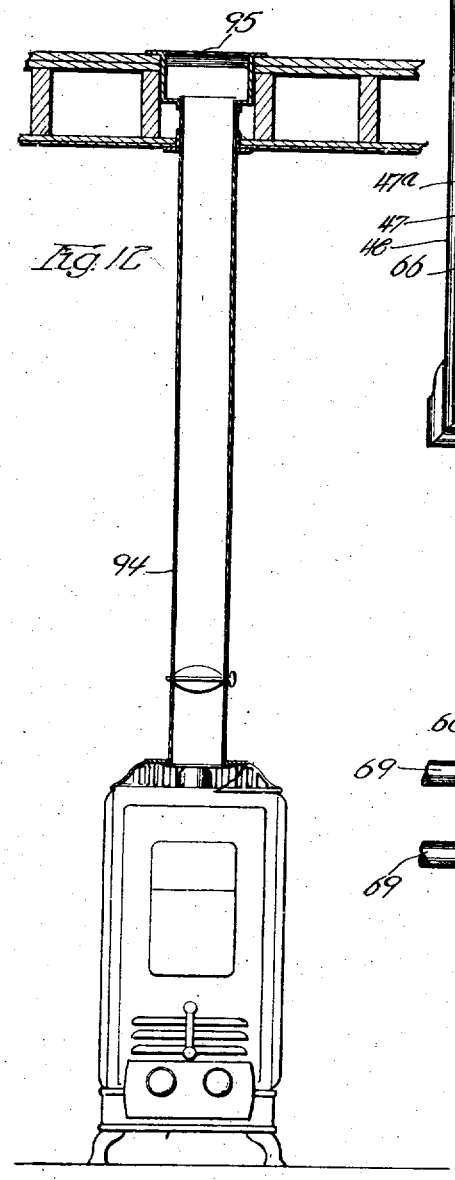
Fig. 12 illustrates a modified embodiment of my invention.
Figure 11:
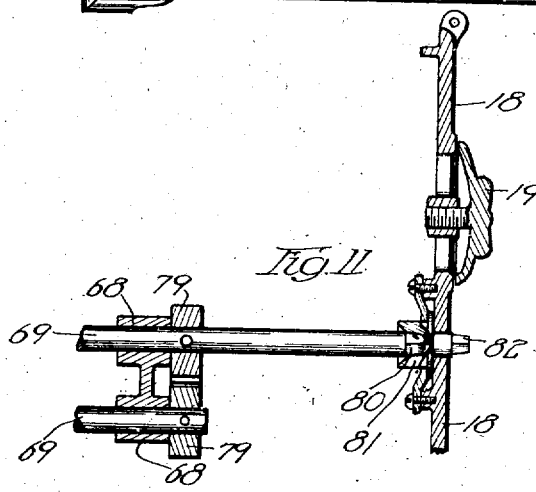
Fig. 11 is a plan detail section of the grate dumping mechanism.

The modified embodiment of my invention illustrated in Fig. 12 is used in connection with a hot air pipe 94 which extends from the heater to a hot air register 95 located at some point remote from the heater, as, for instance, in a room above that in which the heater is located. The lower end of the hot air pipe fits into the opening in the heater dome from which the grid 55 is removed. When this embodiment of my invention is employed, the room in which the heater is located is heated by a portion of the warm air which rises in the space between the casing and the heater drum and escapes through the apertures in the dome. A portion of the heated air which rises in the space between the casing and drum is delivered through pipe 94 to the register 95, as is also the major portion of the superheated air from the Y-shaped pipe 39.

Having thus described my invention, what I claim as new and desire to secure by Letters Patent of the United States is:—

1. In a portable heater adapted to be placed in a living room, the combination of a base formed with a peripheral shoulder; an ash-box formed with a peripheral flange removably seated on the shoulder, the flange being provided with a peripheral upwardly opening channel; a combustion chamber having a fire-pot supported on the ash-box; a casing having its lower edge loosely seated in said channel and laterally enclosing and spaced from the combustion chamber and fire-pot, the casing being formed with air inlet openings surrounding and directly opposite the fire-pot; and a dome secured to and spaced above the top of the combustion chamber and slidably contacting with the surface of the casing, the dome being encircled with air escape openings.

2. In a portable heater adapted to be placed in a living room, the combination of a base formed with a peripheral shoulder; an ash-box formed with a peripheral flange removably seated on the shoulder, the flange being provided with a peripheral upwardly opening channel; a combustion chamber having a fire-pot supported on the ash-box; a casing having its lower edge loosely seated in said channel and laterally enclosing and spaced from the combustion chamber and fire-pot, the casing being formed with air inlet louver openings surrounding and directly opposite the fire-pot; and a dome secured to and spaced above the top of the combustion chamber and slidably contacting with the surface of the casing, the dome being encircled with air escape openings.

3. In a portable heater adapted to be placed in a living room, the combination of a base formed with a peripheral shoulder; an ash-box formed with a peripheral flange removably seated on the shoulder; the flange being provided with a peripheral upwardly opening channel; a combustion chamber having a fire-pot supported on the ash-box; a casing having its lower edge loosely seated in said channel and laterally enclosing and spaced from the combustion chamber and fire-pot, the casing being formed with air inlet louver openings surrounding and directly opposite the fire-pot, the space between the casing and the combustion chamber and fire-pot being entirely closed at the bottom by the ash-box; and a dome secured to and spaced above the top of the combustion chamber and slidably contacting with the surface of the casing, the dome being encircled with air escape openings.

4. A portable circulation type convection heater adapted to be placed in a living room and to heat the air therein primarily by convection, comprising a combustion chamber having a fire-pot section at the lower part thereof and a drum section surmounting the fire-pot, and an outer casing enclosing said combustion chamber, said casing being of substantially rectangular cross-sectional outline substantially throughout its height and spaced from the combustion chamber in energy radiating and absorbing relationship therewith to provide an air passage of liberal proportions for the free circulation of a large volume of air through the heater, said passage having an air inlet opening thereinto adjacent the lower end of said passage to admit the air to be heated into contact with the heated walls of said passage and an outlet for the discharge of said heated air adjacent the upper end of each passage, said passage and inlet opening being of liberal proportions to permit the free flow of air therethrough, and said casing being imperforate in its extent intermediate the said inlet and discharge openings.

5. A portable heater adapted to be placed in a living room and to heat the air therein primarily by convection, comprising a combustion chamber having a fire-pot section at the lower part thereof and a combustion section surmounting the fire-pot, and a casing enclosing said combustion chamber and spaced therefrom, said casing embodying four substantially flat rectangular sides interconnected at their side edges to provide a casing of substantially rectangular cross-section throughout its height and spaced from the combustion chamber in energy radiating and absorbing relationship therewith to provide an air passage of liberal proportions for the free circulation of a large volume of air through the heater, said casing having a discharge opening of liberal size adjacent the lower end of said passage permitting free discharge of the heated air from the heater, said sides having a series of spaced openings at their lower portions adjacent the fire-pot section providing an air inlet opening of liberal size permitting free inflow of large quantities of air to be heated into said air passage, and being imperforate between the said inlet and discharge openings.

6. A portable circulation type convection heater adapted to be placed in a living room and to heat the air therein primarily by convection, comprising a combustion chamber having a fire-pot section at the lower part thereof and a combustion section surmounting the fire-pot, and a casing having imperforate upper and central wall portions enclosing said combustion chamber and spaced therefrom, said casing being of substantially rectangular cross-sectional outline substantially throughout its height and spaced from the combustion chamber in energy radiating and absorbing relationship therewith to provide an enclosed air passage of liberal proportions for the free circulation of a large volume of air through the heater, and liberally proportioned means for admitting a large amount of cold air to be heated through contact with the walls of the combustion chamber and the casing into the passage between the combustion chamber and the casing adjacent a point in said passage above which the passage is at all points of large cross-sectional area providing for free and unrestricted flow of air.

7. A portable circulation type convection heater adapted to be placed in a living room and to heat the air therein primarily by convection, comprising a combustion chamber having a fire-pot section at the lower part thereof and a cylindrical side wall section surmounting the fire-pot, and an outer casing enclosing said combustion chamber, said casing being of substantially rectangular cross-sectional outline substantially throughout its height and spaced from the combustion chamber in energy radiating and absorbing relationship therewith substantially throughout its height to provide an air passage of liberal proportions for the circulation of a large volume of air through the heater, said passage having an air inlet of liberal area opening thereinto adjacent the lower end thereof to admit the air to be heated without materially restricting the flow of air through the heater, into contact with the heated walls of said passage, and a discharge opening adjacent the upper end of said passage providing for free flow of heated air from said passage, said casing being imperforate throughout its extent intermediate the said inlet and discharge openings, and a superheating conduit connected to the said passage in heat transferring relationship with the combustion chamber, to increase the effective movement of the heated air through said air passage.

8. A portable heater adapted to be placed in a living room and to heat the air therein primarily by convection, comprising a combustion chamber having a fire-pot section at the lower part thereof and a combustion section surmounting the fire-pot, an ash box section supporting said fire-pot section, a base on which said ash box section is mounted, and a casing enclosing said combustion section and fire-pot section and spaced therefrom, said casing embodying four comparatively flat rectangular sides imperforate throughout their upper and major extent and interconnected at their side edges to provide a casing of substantially rectangular cross-section throughout its height and spaced from the combustion chamber in energy radiating and absorbing relationship therewith to provide an air passage of liberal proportions for the free circulation of a large volume of air through the heater, said four sides extending down substantially to said base so that said sides and ash box section are supported upon the base substantially at a common joint, said sides having a series of horizontally arranged openings adjacent the fire box section to provide an air inlet opening of liberal area to permit the free flow therethrough of air to be heated.

9. A portable heater adapted to be placed in a living room and to heat the air therein primarily by convection, comprising a combustion chamber having a fire-pot section at the lower part thereof and a combustion section surmounting the fire-pot, an ash box section below said fire-pot section, a casing enclosing said sections and spaced therefrom, said casing embodying four substantially flat rectangular sides interconnected at their side edges to provide a casing of substantially rectangular cross-section throughout its height and spaced from the combustion chamber in energy radiating and absorbing relationship therewith to provide an air passage of liberal proportions for the free circulation of a large volume of air through the heater, means for supporting said casing and said sections, said sides having a series of vertically spaced horizontal louvers therein adjacent the fire box section to provide an air inlet opening of liberal area, said air passage having a discharge opening connected thereto for the escape of the heated air, said sides being imperforate throughout their extent between the said louvers and the said discharge opening.

10. A circulation type convection heater adapted to be placed in a living room and to heat the air therein primarily by convection, comprising a combustion chamber having a fire-pot section at the lower part thereof and a combustion section surmounting the fire-pot, and a casing enclosing said combustion chamber and spaced therefrom, said casing embodying four substantially flat rectangular sides interconnected at their side edges to provide a casing of substantially rectangular cross-section throughout its height and spaced from the combustion chamber in energy radiating and absorbing relationship therewith to provide an air passage of liberal proportions for the free circulation of a large volume of air through the heater, a top for said casing having a discharge opening of liberal size permitting the free escape of heated air from the heater, said sides having imperforate upper and central portions and having a series of vertically spaced louvers at their lower portions adjacent the fire-pot section providing an air inlet opening of large total size offering no substantial restriction to the flow of air to the heater.

In witness whereof I have hereunto subscribed my name this 23rd day of May, 1925.

BERTRAND B. KAHN.